United States Patent [19]

Clegg

[11] Patent Number: 4,598,635
[45] Date of Patent: Jul. 8, 1986

[54] REVOLVING SAUCEPAN TURNTABLE

[76] Inventor: John E. Clegg, 2320 Keystone Dr., Orlando, Fla. 32806

[21] Appl. No.: 740,703

[22] Filed: Jun. 3, 1985

[51] Int. Cl.[4] .............................................. A47J 37/00
[52] U.S. Cl. ........................................ 99/348; 99/423;
 108/20; 108/139; 126/338; 366/144; 366/208
[58] Field of Search ............ 99/348, 423, 427, 443 R,
 99/409; 426/523; 108/20, 139; 126/338 R;
 366/144, 208, 209, 213

[56] References Cited

U.S. PATENT DOCUMENTS

| 2,829,528 | 4/1958 | Hulick | 99/348 X |
| 2,959,403 | 11/1960 | Fisher | 366/208 |
| 2,976,792 | 3/1961 | Chambers | 366/208 X |
| 3,885,357 | 5/1975 | Hoyt | 366/209 X |
| 4,417,506 | 11/1983 | Herbst | 99/348 |
| 4,504,715 | 3/1985 | Jorgensen | 99/423 X |

Primary Examiner—Billy J. Wilhite

[57] ABSTRACT

A revolving motor-driven turntable for a saucepan which automatically moves and mixes liquid food being cooked over a gas burner. The motion imparted to the food by the revolution of the saucepan eliminates the need of stirring.

1 Claim, 2 Drawing Figures

REVOLVING SAUCEPAN TURNTABLE

BACKGROUND

Prior art includes the two patents described below:
1. Home Cooking Appliance, U.S. Pat. No. 4,417,506 by Herbst et al. This appliance features a stir member mounted in the bottom of a deep saucepan and revolved by an electric motor mounted below the saucepan.
2. Portable Turntable For Use In Microwave Ovens, U.S. Pat. No. 4,504,715 by Jorgensen et al. This device features a turntable mounted inside a portable casing and driven by an oscillating spring motor.

DRAWINGS

DESCRIPTION

Figure 1:
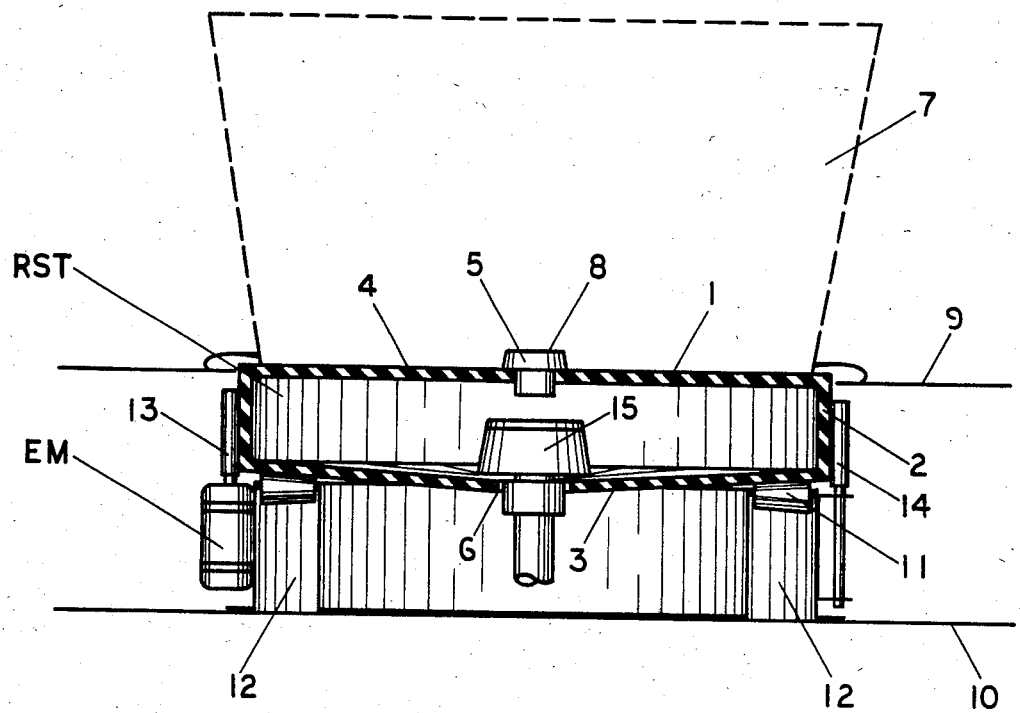
FIG. 1 is an elevation of the revolving saucepan turntable.

FIG. 1 shows the two major components of the invention; revolving saucepan turntable RST and electric motor EM.

Turntable RST consists of support rack 1, cylindrical wall 2 and conical base 3.

Figure 2:
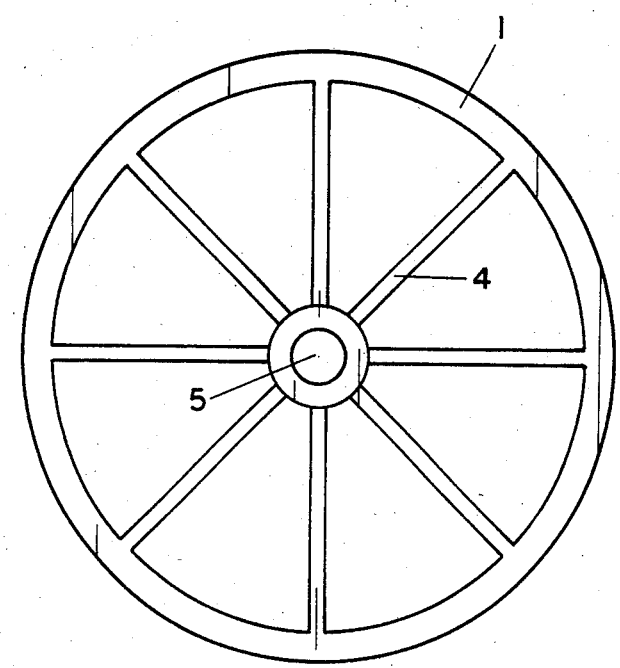
FIG. 2 is a plan view of the support rack.

Support rack 1 comprises eight radial rods 4 (FIG. 2) occupying the horizontal plane and extending outward from elevated central hub 5 to the upper edge of cylindrical wall 2 to which rods are integrally adjoined.

Cylindrical wall 2 comprises a hollow cylinder with a smooth outer surface which engages the revolving means.

Conical base 3 comprises a conical metal plate with a central hole 6 enclosing the stem of the gas burner and with a smooth lower surface engaging tapered rollers on which the turntable RST revolves. Conical base 3 is integrally adjoined to the lower edge of cylindrical wall 2.

Saucepan 7 has a central depression 8 in the bottom thereof which accommodates central hub 5 as aligning means. Central hub 5 can be removed when flat-bottomed nonrevolving saucepans are used.

Horizontal line 9 indicates the top surface of the burner compartment of the gas range in which the revolving saucepan turntable RST is installed. Horizontal line 10 indicates the base of the burner compartment.

Turntable RST revolves on four tapered rollers 11 mounted on shafts supported at the ends by annular frame 12. Annular frame 12 consists of concentric inner and outer cylindrical members riveted to the base of the burner compartment.

Turntable RST is revolved by one or two electric motors EM with rubber-rimmed shafts 13 which engage the outer surface of cylindrical wall 2. Two speeds of revolution are possible when two motors are used. Thirty-three revolutions of shafts 13 are required to produce one revolution of turntable RST.

Vertical cylindrical rollers 14 provide alignment of turntable RST.

Gas burner 15 is stationary.

A revolving electric hot-plate burner is an obvious modification of the turntable disclosed herein.

I claim:

1. A cooking appliance comprising a revolving saucepan turntable (RST), an annular frame (12) positioned beneath and supporting said turntable, said turntable comprising a support rack (1), a cylindrical wall (2) and a conical base (3), said support rack comprising eight radial rods (4) occupying a horizontal plane and an elevated central hub (5), said rods extending outwardly from said hub to an upper edge of said cylindrical wall to which said rods are integrally adjoined, said cylindrical wall comprising a hollow cylinder having a smooth outer surface, an electric motor (EM) mounted on said annular frame and having a rubber-rimmed shaft which is adapted to engage and revolve said turntable and a saucepan thereon, said conical base comprising a conical plate having a central opening (6) therein and adapted to receive a stem of a gas burner therethrough, said annular frame having a plurality of tapered rollers (11) thereon and adapted to support an outer outside surface of said conical plate to rotatably support said turntable, said annular frame comprising concentric inner and outer cylindrical members adapted to be riveted to a base of a burner.

* * * * *